Sept. 18, 1962   M. M. FRONSOE, JR   3,054,120
COLLAPSIBLE BUNK BED
Filed March 31, 1960
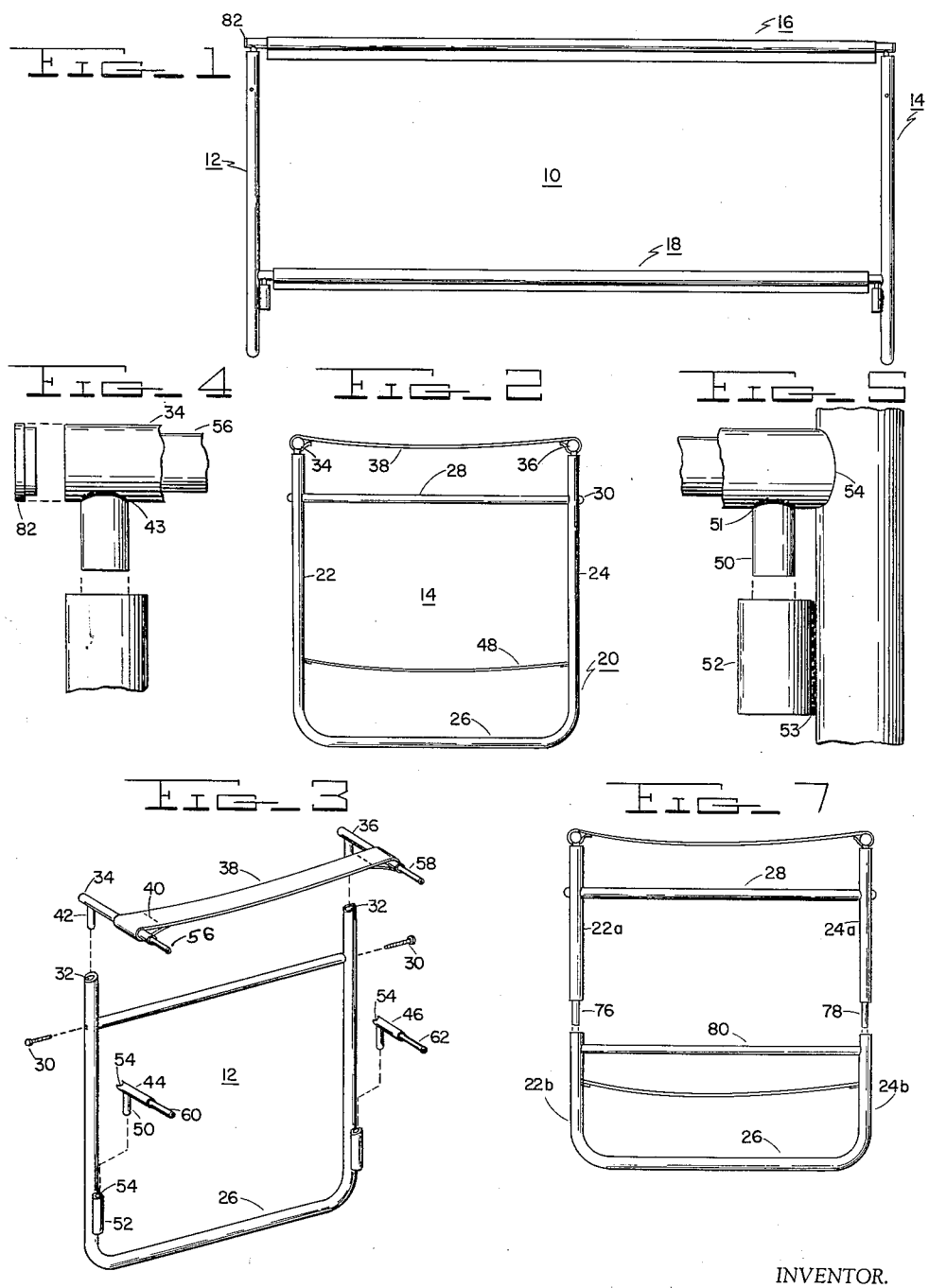
INVENTOR.
MILTON M. FRONSOE, Jr.
BY Gust & Irish
ATTORNEYS

United States Patent Office 3,054,120
Patented Sept. 18, 1962

3,054,120
COLLAPSIBLE BUNK BED
Milton M. Fronsoe, Jr., 1715 Riedmiller Road,
Fort Wayne, Ind.
Filed Mar. 31, 1960, Ser. No. 19,093
1 Claim. (Cl. 5—9)

This invention relates generally to bunk beds and more particularly to portable collapsible bunk bed constructions.

Bunk beds, i.e., of the double-deck type having vertically spaced lower and upper beds, are highly desirable for providing sleeping accommodations for two people occupying a minimum of floor area. A light weight, readily portable and easily collapsible bunk bed is highly desirable for use in camping, trailers, and even for accommodating guests in a home. However, while many bunk bed constructions have been provided, and many of these may be disassembled for moving and storage purposes, to the best of the present applicant's knowledge, no prior bunk bed construction possesses the requisite portability and ease of assembly to permit its use for the aforesaid purposes. Manifestly, a portable collapsible bunk bed must possess sufficient structural strength to accommodate adults and must be characterized by its simplicity and relatively low cost.

It is therefore an object of my invention to provide a light-weight, highly portable and readily collapsible bunk bed incorporating the desirable features enumerated above.

In accordance with my invention, I provide a portable, collapsible bunk bed assembly comprising a pair of longitudinally spaced, parallel, vertical bed ends, with each bed end comprising a pair of elongated, transversely spaced, parallel, vertical tubular members open at their upper ends with at least one elongated transverse member extending therebetween. An upper bed is provided comprising a first pair of elongtaed, transversely spaced, parallel, longitudinal members respectively extending between the bed ends and with sheet material secured thereto substantially throughout their lengths and extending transversely therebetween. Each of the first pair of longitudinal members has a stud depending therefrom adjacent each end, these studs being removably inserted in the open upper ends of the respective vertical members thereby removably supporting the upper bed on the two bed ends. Each of the vertical members has a vertically extending tubular socket member secured on its side at a point spaced downwardly from its upper end, the socket members being open at their upper ends and the socket members of each bed end being in transverse alignment. A lower bed is provided comprising a second pair of elongated, transversely spaced, parallel, longitudinal members respectively extending between the bed ends and with sheet material secured thereto substantially throughout their lengths and extending transversely therebetween. Each of the second pair of longitudinal members has a stud depending therefrom adjacent each end, these studs of the second pair of longitudinal members being removably inserted in the upper open ends of the respective socket members, thereby removably supporting the lower bed on the two bed ends.

Further objects and advantages of my invention will become apparent by reference to the following description and the accompanying drawing, and the features of novelty which characterize my invention will be pointed out with particularity in the claim annexed to and forming a part of this specification.

In the drawing:

FIG. 1 is a side-elevational view of my improved portable collapsible bunk bed;

FIG. 2 is an end view of the bunk bed of FIG. 1;

FIG. 3 is a fragmentary exploded perspective view illustrating the assembly of the bunk bed of FIGS. 1 and 2;

FIG. 4 is a fragmentary view showing in further detail the removable mounting of the upper bed on the bed ends;

FIG. 5 is another fragmentary view showing in further detail the removable mounting of the lower bed on the bed ends;

FIG. 6 is a fragmentary view, partly in section and partly broken away, illustrating one method of joining the longitudinal members of the previous figures; and FIG. 7 is an end view showing one method of providing either a double decker bunk bed or two cots.

Referring now to FIGS. 1 through 5 of the drawings, my improved portable collapsible bunk bed, generally identified at 10, comprises two bed ends 12 and 14 which support upper and lower beds 16 and 18.

Each of the bed ends 12 and 14 comprises a U-shaped member 20 formed of tubular metal, such as seamless steel tubing. It will be seen that the U-shaped member 20 has two vertically upstanding leg portions 22 and 24 with connecting portion 26 which supports the bed on the floor or other supporting surface. In order to provide the requisite rigidity, a transverse member 28 is provided also formed of suitable tubular metal extending between leg portions 22 and 24 and secured thereto in any suitable manner, as by threaded fasteners 30. The upper ends 32 of leg portions 22 and 24 are respectively open, as best seen in FIG. 3.

Upper bed 16 comprises a pair of elongated, transversely spaced apart, parallel, longitudinal members 34 and 36 formed of suitable tubular metal and extending between bed ends 12 and 14, as shown. Suitable fabric 38, such as canvas, is secured to tubular members 34 and 36 substantially throughout their lengths and extends therebetween. It will be readily understood that the side edges of the fabric 38 may be wrapped around longitudinal members 34 and 36 and sewed, as at 40 in FIG. 3. Each of the longitudinal tubular members 34 and 36 has relatively short stud members 42 also preferably formed of suitable tubular metal secured adjacent its ends and depending therefrom, as seen in FIGS. 3 and 4; studs 42 may be welded to tubular members 34 and 36, as at 43 in FIG. 4. The outside diameter of studs 42 is sufficiently smaller than the inside diameter of the tubular leg portions 22 and 24 of bed ends 12 and 14 to permit their ready insertion in open upper ends 32 of legs 22 and 24. Thus, the tubular longitudinal members 34 and 36 of upper bed 16 have their studs 42 removably inserted in the open upper end 32 of the respective legs 22 and 24 of bed ends 12 and 14, thereby to support upper bed 16.

Lower bed 18 similarly comprises a pair of elongated, transversely spaced, parallel, longitudinal members 44 and 46 formed of suitable tubular metal and extending between bed ends 12 and 14. Fabric 48 is secured to members 44 and 46 substantially throughout their lengths and extends therebetween, as shown. Longitudinal tubular members 44 and 46 of lower bed 18 similarly have relatively short studs 50 formed of tubular metal attached adjacent each end and depending therefrom, as shown. As best seen in FIG. 5, studs 50 are preferably welded to longitudinal tubular members 44 and 46 adjacent their ends, as at 51 in FIG. 5. In order to support lower bed 18 on bed ends 12 and 14, each bed end has a pair of relatively short, vertically extending socket members 52 formed of suitable tubular metal respectively secured to the sides of legs 22 and 24 by welding, as at 53 in FIG. 5. It will be seen that the tubular socket members 52 are disposed intermediate the upper open ends 32 of legs 22 and 24 and the connecting portion 26, and that the socket members 52 at each bed end are in transverse alignment and face the other bed end. It will further be seen that the upper ends 54 of tubular socket members 52 are open, as best seen in FIG. 3. Tubular studs 50 of the longitudinal tubular members 44 and 46 of lower bed 18 respectively have outside diameters smaller than the inside diameters of tubular socket members 52 and thus, longitudinal tubular members 44 and 46 of lower bed 18 have their studs 50 removably inserted in the open ends 54 of respective tubular socket members 52, thereby to support lower bed 18 from bed ends 12 and 14. For further rigidity, ends 54 of longitudinal tubular members 44 and 46 of lower bed 18 are preferably curved so as partially to embrace the respective leg portions 22 and 24 of ends 12 and 14.

While longitudinal tubular members 34, 36, 44 and 46 of upper and lower beds 16 and 18 may each be formed as a single unitary section of tubular metal, I have found it desirable in order to provide the requisite strength telescopically to arrange inner members 56, 58, 60 and 62 formed of suitable tubular metal respectively within longitudinal tubular members 34, 36, 44 and 46, the inner longitudinal tubular members being respectively substantially coextensive in length with the outer longitudinal tubular members.

For greater portability, it may be desirable to provide joints in the longitudinal tubular members 34, 36, 44 and 46, such joints may be provided as shown in FIG. 6. Here, each longitudinal member of the upper and lower beds 16 and 18 is shown as being divided into two sections 64 and 66 with the inner tubular member 68 of section 64 extending outwardly beyond the outer tubular member 70 thereby to form a male end, and with the inner tubular member 72 of section 66 terminating short of the end of the outer tubular member 74 thereby to form a female end. It will thus be readily seen that the male end 68 of section 64 can be readily removably inserted in female end 74 of section 66, thereby to form a readily assembled and disassembled joint for the longitudinal tubular members 34, 36, 44 and 46 of upper and lower beds 16 and 18.

It may also be desirable in the interests of greater portability and also optionally to provide two separate cots in lieu of one double deck bunk bed, to provide joints in the legs 22 and 24 of ends 12 and 14, and such an arrangement is shown in FIG. 7. Here, legs 22 and 24 are horizontally divided into upper sections 22a and 24a, and lower sections 22b and 24b. These sections are removably joined in a manner similar to the joining of two sections of the longitudinal tubular members as shown in FIG. 6. Thus, inner tubular members 76 and 78 are respectively provided within tubular members 22a and 24a, the inner tubular members 76 and 78 respectively extending beyond the lower ends of outer tubular members 22a and 24a, thus forming male ends for removable insertion in the exposed open ends of the lower tubular members 22b and 24b. In the embodiment of FIG. 7, it may be desirable to provide an additional transverse tubular member 80 extending between the lower tubular leg portions 22b and 24b. In the embodiment of FIG. 7, the transverse tubular members 28 and 80 are shown as being respectively welded to the respective leg portions 22a, 24a, 22b and 24b.

While I have illustrated and described specific embodiments of my invention, further modifications and improvements will occur to those skilled in the art and I desire therefore, in the appended claim, to cover all modifications which do not depart from the spirit and scope of my invention.

What is claimed is:

A portable collapsible bunk bed assembly comprising: a pair of longitudinally spaced, parallel, vertical bed ends, each bed end comprising an integral U-shaped member formed of tubular metal with its legs upstanding and open at their upper ends and with its connecting portion supporting said bunk bed on a floor, and a transverse member formed of tubular metal extending between said legs adjacent their ends; an upper bed comprising a first pair of elongated, transversely spaced parallel longitudinal members formed of tubular metal and respectively extending between said bed ends, and fabric secured to said first pair of longitudinal members substantially throughout their lengths and extending transversely therebetween, each of said first pair of longitudinal members having a relatively short stud formed of tubular metal secured thereto adjacent each end and depending therefrom, each of said first pair of longitudinal members having its studs removably inserted in said open upper ends of the respective legs of said bed ends, thereby removably supporting said upper bed; each of the legs of each of said bed ends having a relatively short vertically extending socket member formed of tubular metal secured on its side intermediate its upper end and its connecting portion, said socket members being open at their upper ends and the socket members of each said bed end being in transverse alignment and facing the other bed end; and a lower bed comprising a second pair of elongated, transversely spaced parallel longitudinal members formed of tubular metal and respectively extending between said bed ends, and fabric secured to said second pair of longitudinal members substantially throughout their lengths and extending transversely therebetween, each of said second pair of longitudinal members having a relatively short stud formed of tubular metal secured thereto adjacent each end and depending therefrom, each of said second pair of longitudinal members having its studs removably inserted in said open ends of the respective socket members of said bed ends thereby removably supporting said lower bed.

References Cited in the file of this patent

UNITED STATES PATENTS

| | | |
|---|---|---|
| 467,979 | Latulip | Feb. 2, 1892 |
| 1,004,243 | Cooper | Sept. 26, 1911 |
| 1,512,786 | Morton | Oct. 21, 1924 |
| 2,239,951 | Bromschwig | Apr. 29, 1941 |
| 2,646,577 | Thayer | July 28, 1953 |
| 2,882,099 | Symons | Apr. 14, 1959 |
| 2,900,956 | Hoffman | Aug. 25, 1959 |

FOREIGN PATENTS

| | | |
|---|---|---|
| 28,654 | Finland | Feb. 2, 1957 |
| 568,759 | Great Britain | Apr. 19, 1945 |
| 1,172,926 | France | Oct. 20, 1958 |